United States Patent [19]
Veraart

[11] Patent Number: 5,118,055
[45] Date of Patent: Jun. 2, 1992

[54] REDUCED VOLTAGE BRAKING SYSTEM IN A LINEAR MOTOR IN-TRACK TRANSIT SYSTEM

[75] Inventor: Pierre Veraart, Kingston, Canada

[73] Assignee: UTDC, Inc., Kingston, Canada

[21] Appl. No.: 548,265

[22] Filed: Jul. 5, 1990

[51] Int. Cl.⁵ .......................... B61L 3/12; B61L 3/22
[52] U.S. Cl. .............................. 246/31; 246/187 R; 246/182 R; 104/295; 104/302
[58] Field of Search ............... 104/281, 287, 288, 290, 104/292, 295, 302; 246/31, 63 R, 63 C, 63 A, 182 R, 187 R, 187 A, 187 B; 191/10

[56] References Cited

U.S. PATENT DOCUMENTS

| | | | |
|---|---|---|---|
| 3,506,862 | 4/1970 | Nomura et al. | 310/93 |
| 3,540,541 | 11/1970 | Hayes et al. | 246/29 R X |
| 3,691,368 | 9/1972 | Hoyler | 246/63 A X |
| 3,736,880 | 6/1973 | Ross | 104/148 MS |
| 3,768,417 | 10/1973 | Thornton et al. | 104/298 X |
| 3,774,025 | 11/1973 | Auer, Jr. et al. | 246/63 A |
| 3,803,466 | 4/1974 | Starkey | 318/135 |
| 3,827,371 | 8/1974 | Onoda | 104/148 LM |
| 3,828,236 | 8/1974 | Close | 246/187 B X |
| 3,847,089 | 11/1974 | Nelson | 104/292 X |
| 3,848,836 | 11/1974 | Wallgard et al. | 246/63 R |
| 3,874,301 | 4/1975 | Alimanestianu | 104/298 |
| 3,880,088 | 4/1975 | Grant | 104/168 |
| 3,904,942 | 9/1975 | Holtz | 318/135 |
| 3,934,183 | 1/1976 | Saufferer | 104/294 X |
| 3,937,431 | 2/1976 | Guntner | 246/182 B |
| 3,967,801 | 7/1976 | Baughman | 246/34 R |
| 3,974,778 | 8/1976 | Black et al. | 104/148 LM |
| 3,979,092 | 9/1976 | Perry et al. | 246/187 B X |
| 4,014,503 | 3/1977 | Raimer | 246/63 C X |
| 4,061,089 | 12/1977 | Sawyer | 104/23 FS |

(List continued on next page.)

FOREIGN PATENT DOCUMENTS

| | | | |
|---|---|---|---|
| 0158114 | 10/1985 | European Pat. Off. | |
| 0160523 | 11/1985 | European Pat. Off. | |
| 278532 | 8/1988 | European Pat. Off. | |
| 2257773 | 5/1974 | Fed. Rep. of Germany | 104/282 |
| 0012804 | 1/1989 | Japan | 104/281 |

OTHER PUBLICATIONS

Patent Abstracts of Japan, vol. 5, No. 163 (E-78) (835), Oct. 20, 1981.
Patent Abstracts of Japan, vol. 10, No. 105 (M-471) (2162), Apr. 19, 1986.
Patent Abstracts of Japan, vol. 9, No. 110 (E-314) (1833), May 15, 1985.

*Primary Examiner*—Frank E. Werner
*Assistant Examiner*—Scott L. Lowe
*Attorney, Agent, or Firm*—James A. Drobile; Robert E. Rosenthal

[57] ABSTRACT

A transit system implementing a reduced voltage braking scheme is provided. The transit system includes a guideway extending between freight loading and freight unloading stations. Freight carrying vehicles are moveable along the guideway between the stations. The guideway is divided into a number of blocks with each block including at least two linear motor primaries located along the guideway at spaced intervals. A controller is associated with each block and communicates with the linear motor primaries as well as with sensors positioned along the guideway within the block. The controller is in communication with the controllers in the adjacent upstream and downstream blocks and provides an occupied signal to the upstream block when a vehicle is detected in the block. When the controller receives an occupied signal from the downstream controller, the controller conditions the linear motor primaries in the block so that when a vehicle enters the block, it is stopped by the linear motor primaries within the block. To reduce large currents from being drawn by the linear motor primaries during the braking operation, the voltage of the power supply is stepped down by a transformer before it is supplied to the linear motor primaries. Since a plurality of linear motor primaries are provided in each block, the applied voltage can be reduced while still providing sufficient braking thrust in the block to stop a vehicle if required.

20 Claims, 6 Drawing Sheets

U.S. PATENT DOCUMENTS

| | | | |
|---|---|---|---|
| 4,068,152 | 1/1978 | Nakamura et al. | 104/298 X |
| 4,142,700 | 3/1979 | Ubel | 246/182 C X |
| 4,166,599 | 9/1979 | Auer, Jr. et al. | 246/63 A |
| 4,305,485 | 12/1981 | Dubreucq | 104/298 X |
| 4,348,618 | 9/1982 | Nakamura et al. | 318/38 |
| 4,381,478 | 4/1983 | Saijo et al. | 246/182 C X |
| 4,471,356 | 9/1984 | Gidl | 246/63 R |
| 4,651,071 | 3/1987 | Imanaka | 318/371 |
| 4,652,800 | 3/1987 | Fukuwatari | 318/135 |
| 4,665,349 | 5/1987 | Matsuo | 318/135 |
| 4,690,066 | 9/1987 | Morishita et al. | 104/282 |
| 4,700,119 | 10/1987 | Karita | 318/587 |
| 4,709,639 | 12/1987 | Geais | 104/292 |
| 4,716,346 | 12/1987 | Matsuo | 318/38 |
| 4,718,621 | 1/1988 | Horinouchi | 104/292 X |
| 4,721,045 | 1/1988 | Okawa et al. | 104/290 |
| 4,721,892 | 1/1988 | Nakamura et al. | 318/38 |
| 4,800,818 | 1/1989 | Kawaguchi et al. | 104/290 |
| 4,819,564 | 4/1989 | Brandis et al. | 104/292 |
| 4,836,344 | 6/1989 | Bolger | 191/10 |
| 4,853,602 | 8/1989 | Hommes et al. | 318/38 |
| 4,931,677 | 6/1990 | Heidelberg et al. | 104/292 X |

REDUCED VOLTAGE BRAKING SYSTEM IN A LINEAR MOTOR IN-TRACK TRANSIT SYSTEM

The present invention relates to a transit system and in particular to a reduced voltage braking scheme for a linear motor in-track transit system.

Transit systems are well known in the art Some conventional transit systems implement linear induction motors (LIM's) wherein the LIM primaries are located at spaced intervals between the rails of a track and wherein the LIM secondaries or reaction rails are secured to the undercarriage of vehicles travelling along the track These transit systems are conventionally designated as LIM in-track transit systems. In these in-track transit systems and as in all transit systems, when more than one vehicles are travelling along the track, it is important to avoid collisions between vehicles This of course requires the speed of all vehicles travelling along the track to be accurately controlled to ensure that vehicle spacing is maintained. In many systems, to increase vehicle throughput, the vehicles are propelled at high speeds. However, the increased speed requires increased headway between vehicles to avoid collisions. Collisions can be avoided by ensuring that the spacing between successive vehicles is large but this substantially reduces vehicle throughput in the transit system. Collisions can also be avoided by increasing the number of LIM primaries positioned along the track and by providing high precision controllers for each of the LIM primaries. However, this collision avoidance scheme increases costs substantially when constructing and operating the system.

Also in these systems, extensive power systems are used to supply all of the LIM primaries disposed between the rails of the track During braking, currents drawn from the power system by the LIM primaries can be large thereby increasing costs due to the assessed penalties from the hydro utility. When vehicles are propelled at high speeds and braking thrusts increase, costs are increased further It is therefore an object of the present invention to obviate or mitigate the above disadvantages by providing a novel transit system and a reduced voltage braking scheme therefor.

According to one aspect of the present invention there is provided a voltage controller for a linear motor primary disposed along a guideway comprising:

switch means operable between first and second conditions, in said first condition, said switch means connecting a linear motor primary to the positive phase sequence of a three phase power supply and in said second condition, said switch means connecting the linear motor primary to the negative sequence of said power supply;

control means operable to actuate said switch means to one of said conditions so that said linear motor primary is operable to generate thrust in a desired direction; and scaling means interconnecting said power supply and said switch means when said switch means is in said second condition to reduce the current drawn from said power supply by said linear motor primary.

In another aspect of the present invention there is provided a transit system comprising:

a guideway;

at least one vehicle moveable along said guideway, said guideway being divided into a plurality of blocks;

at least two linear motor primaries disposed along said guideway within said block at spaced intervals and being operable to supply thrust to a vehicle within said block;

a three phase power supply connectable to said linear motor primaries;

switch means interposed between said power supply and at least one of said linear motor primaries, said switch means being actuable between first and second conditions to connect said linear motor primary to the positive and negative phase sequence of said power supply respectively;

control means operable to actuate said switch means to said first condition in normal operation and to said second condition when it is desired to stop said vehicle in said block; and scaling means interconnecting said power supply and said switch means when said switch means is in said second condition to reduce the current drawn from said power supply by said linear motor primary.

In still yet another aspect of the present invention there is provided a zone in a linear motor in-track transit system, said transit system including a guideway and at least one vehicle moveable along said guideway, said zone being defined by a section of said guideway and comprising:

at least two linear motor primaries disposed along said guideway within said zone at spaced intervals and being operable to supply thrust to a vehicle within said zone;

a three phase power supply connectable to said linear motor primaries;

switch means interposed between said power supply and at least one of said linear motor primaries, said switch means being actuable between first and second conditions to connect said linear motor primary to the positive and negative phase sequence of said power supply respectively;

control means operable to actuate said switch means to said first condition in normal operation and to said second condition when it is desired to stop said vehicle in said zone; and scaling means interconnecting said power supply and said switch means when said switch means is in said second condition to reduce the current drawn from said power supply by said linear motor primary.

Preferably, the control means conditions one of the linear motor primary means to slow a vehicle to a speed below a pre-determined value and the other linear motor primary means located downstream from the one linear motor primary means to stop the vehicle when a sensing means in the adjacent downstream block of the guideway detects the presence of a vehicle. It is also preferred that each block includes a plurality of the one linear motor primary means, each of which is operable to supply a pre-determined forward thrust to a vehicle passing thereover in normal operation if the vehicle is detected as travelling below a pre-determined speed and each of which is operable to supply a predetermined reverse thrust to a vehicle upon conditioning thereof by the control means without stopping the vehicle Preferably, the scaling means reduces the voltage of the power supply so that the current drawn by the linear motor primary when operating to generate a reverse thrust is substantially the same as when operating to generate a forward thrust. It is also preferred that the scaling means is in the form of an auto-transformer, the transformer reducing the voltage of the power supply by about 20% prior to supplying the linear motor primary.

Preferably, the switch means in the form of a reversible contact switch responsive to the control means and operates to reverse the phase sequence of the power supplied to the linear motor primary means to cause the linear motor primary means to provide a reverse thrust to a vehicle upon conditioning by the control means.

The present transit system and reduced voltage braking scheme provide advantages in that high vehicle throughput is achieved while reducing large currents from being drawn from the power supply when braking is required. This of course simplifies the requirements of the power system and reduces costs.

An embodiment of the present invention will now be described by way of example only with reference to the accompanying drawings in which.

Figure 1:
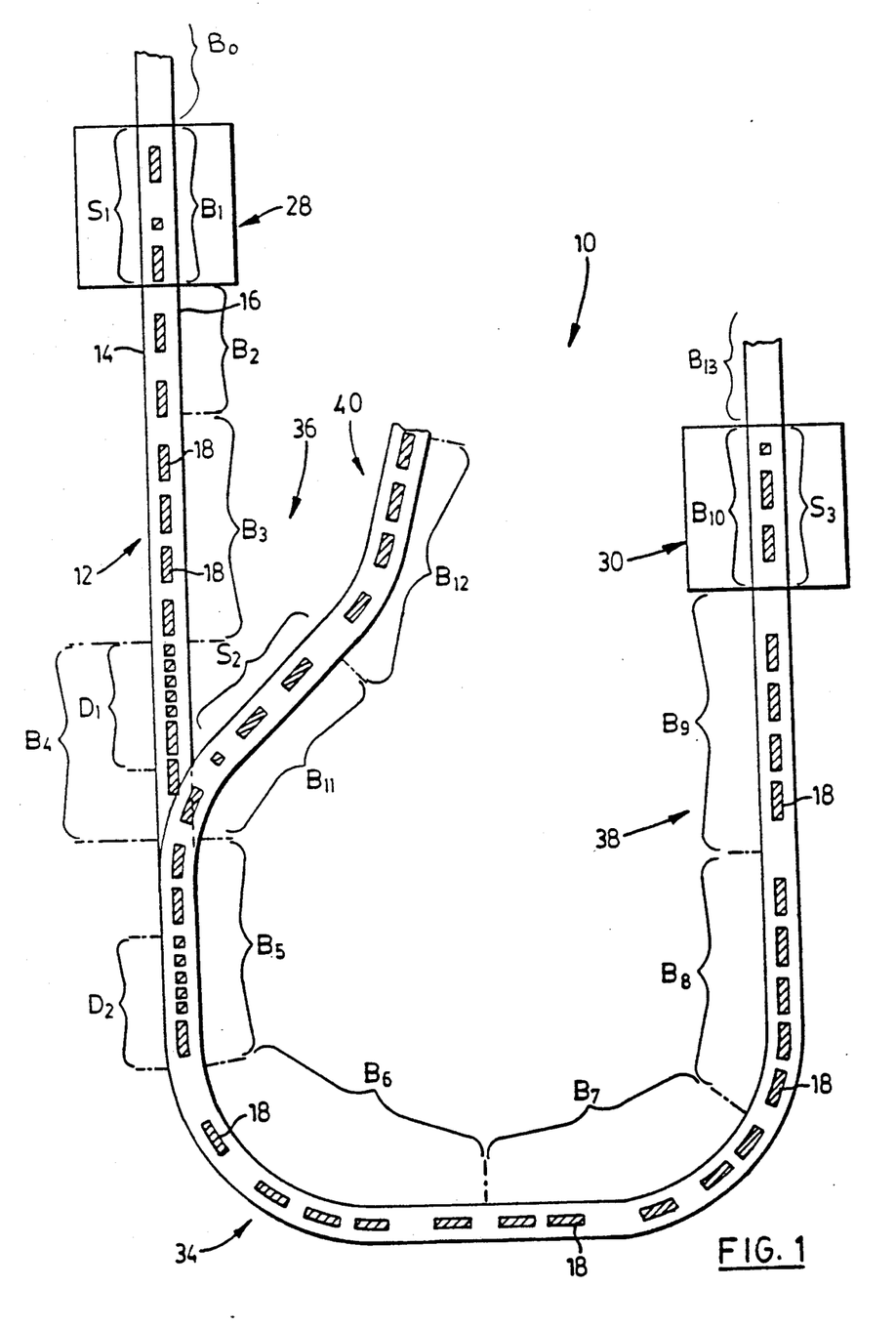
FIG. 1 is a top plan view of a transit system.
Figure 2:
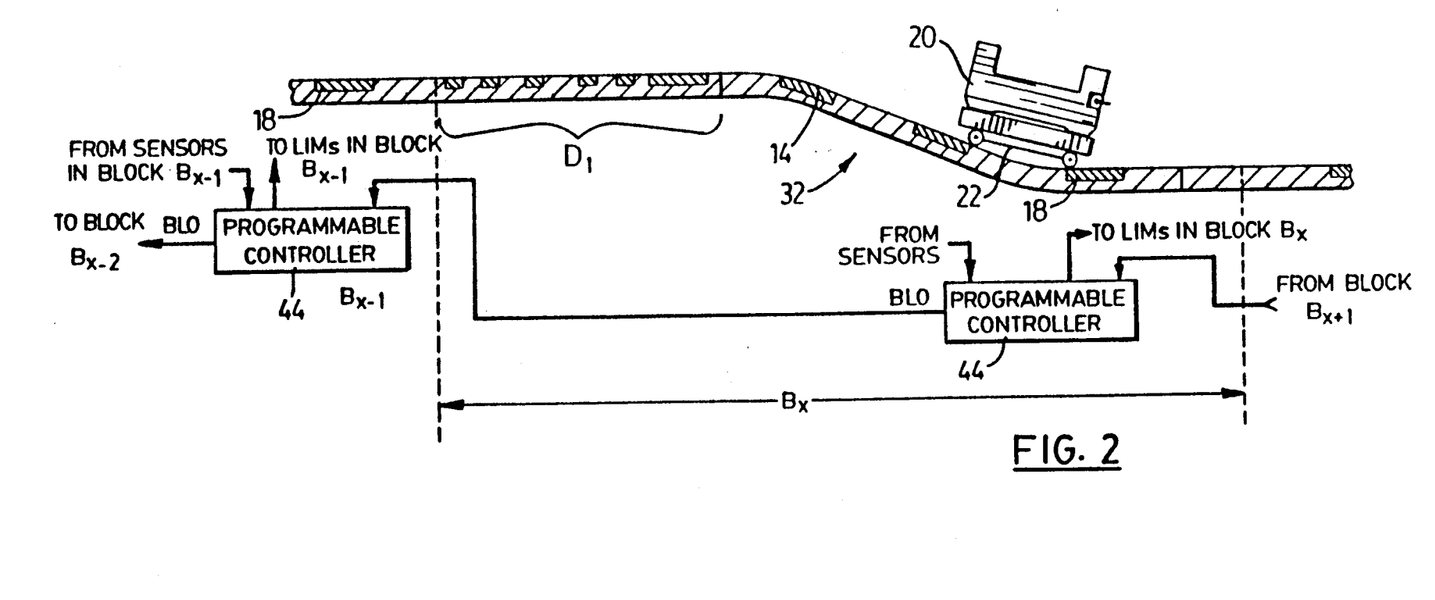
FIG. 2 is a side view of a portion of the transit system shown in FIG. 1.

Referring now to FIGS. 1 and 2, a transit system is shown and generally indicated by reference numeral 10. The transit system 10 includes a track 12 having a pair of rails 14,16. Linear induction motor (LIM) primaries 18 are located between the rails of the track 12 at spaced intervals. Freight-carrying vehicles 20 are supported by the track 12 and are moveable therealong. Each vehicle 20 includes a reaction rail 22 or LIM secondary secured to its chassis which cooperates with the linear induction motor primaries 18 in a known manner to propel the vehicles 20. Since the operation of linear induction motors is well known to those of skill in the art, a detailed description thereof will not be discussed herein.

As can be seen, the track 12 extends between a manual freight loading station 28 and an automatic freight unloading station 30. The majority of the track 12 extending between the two stations 28, 30 is generally horizontal and straight. These sections of the track are designated by reference numerals 36 and 38 and are sections of the track where vehicles are propelled at high speeds to increase vehicle throughput. However, the track also experiences a downgrade 32 (best seen in FIG. 2) and a curve 34 (best seen in FIG. 1) along a portion of its length. Deceleration zones $D_1$ and $D_2$ are designated along portions of the track 12 adjacent the vehicle entrance end of the downgrade 32 and the vehicle entrance end of the curve 34 respectively. The deceleration zones $D_1$ and $D_2$ are identical and function to slow vehicles 20 travelling along the track between the stations 28,30 to a desired speed before the vehicles leave the deceleration zones and enter the following sections of track. The deceleration zones are discussed in more detail in Applicants co-pending Patent Application entitled "Deceleration Zone In A Linear Motor In-Track Transit System" filed on even date herewith.

A merging section of track 40 intersects the main track 12 at a location adjacent the bottom of the downgrade 32. Similarly, the merging section of track 40 has linear induction motor primaries 18 disposed between the rails thereof at spaced intervals to propel vehicles 20.

Vehicle stopping zones $S_1$ and $S_3$ are designated along the track 12 in the loading and unloading stations 28,30 respectively and function to stop the vehicles 20 at the stations so that freight can be placed on the vehicles and removed therefrom. A stopping zone $S_2$ is also designated along a section of the merge track 40 so that vehicles travelling therealong are automatically stopped before entering the main track 12. The stopping zones $S_1$, $S_2$ and $S_3$ include a primary brake and a secondary brake, each brake of which is operable to stop the vehicle. However, the secondary brake remains in an inoperative condition unless the vehicle 20 has been detected as passing a designated stopping point in the stopping zone due to failure or malfunction of the primary brake. The stopping zones are discussed in more detail in Applicants co-pending Patent Application entitled "Stopping Zones In A Linear Motor In-Track Transit System" filed on even date herewith.

To increase throughput in the transit system 10, it is desired to move the vehicles 20 along the track 12 between the loading and unloading stations 28,30 respectively as fast as possible with accurate control to avoid high speed collisions. This collision avoidance is achieved by dividing the track into fixed segments or blocks $B_1$ to $B_{12}$. When a vehicle 20 is detected as being present in a block $B_x$ by sensors positioned along the track, a block occupied signal BLO is generated by a controller 44 in the block $B_x$ and is applied to the controller 44 in the previous or upstream block $B_{x-1}$. If a vehicle enters the previous block $B_{x-1}$ while the controller 44 therein is receiving the block occupied signal BLO from the adjacent downstream block $B_x$, the LIM primaries 18 in the block $B_{x-1}$ are operated by the controller 44 in a manner to cause the vehicle 20 to be stopped within the block $B_{x-1}$. This prevents two vehicles from being located within the same block and thus, avoids collisions between vehicles and maintains vehicle spacing. This operation is achieved by ensuring that the length of each block $B_x$ is sufficient to stop a vehicle completely or at least to slow a vehicle to a speed such that even if the vehicles collide in the block $B_x$, the impact resulting from the collision can be withstood by the vehicles without any resulting damage. The operation of the transit system 10 in this manner to avoid collisions will now be more fully described.

Figure 3:
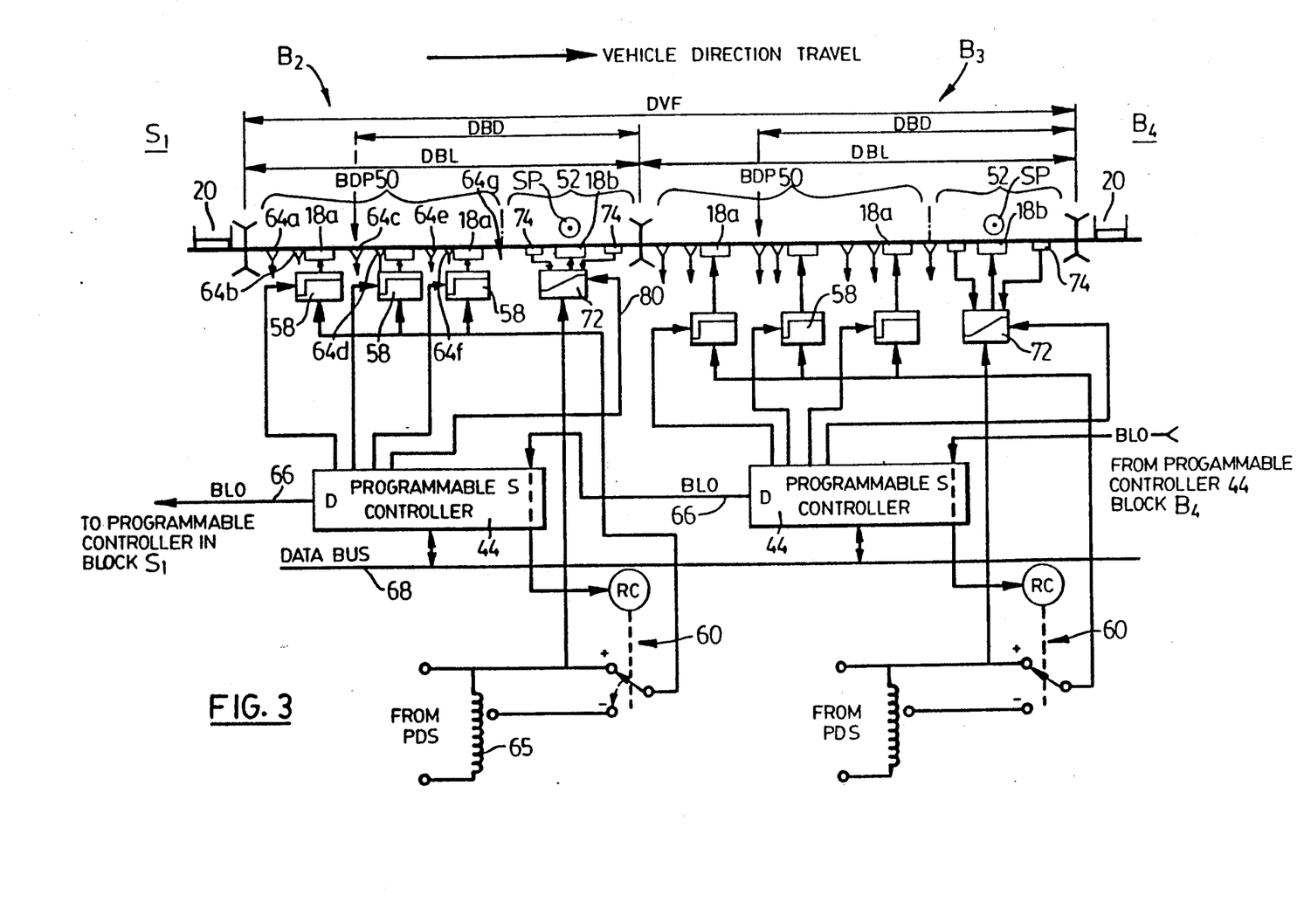
FIG. 3 is a side view of another portion of the transit system shown in FIG. 1.

Referring now to FIG. 3, a portion of the "high speed zone" section of the track 36 including two complete segments or blocks $B_2$ and $B_3$ respectively is shown. The length of the two adjacent blocks $B_2$ and $B_3$ is labelled as DVF while the length of each block is indicated by DBL. As can be seen, each block is substantially identical and is divided into two sections, namely a speed conditioning section 50 and an end section 52. The speed conditioning sections 50 include three cruise linear induction motor (LIM) primaries 18a located at spaced intervals between the rails of the track 12 within the blocks. The cruise LIM primaries 18a are chosen to have characteristics to enable a "worst case" vehicle 20 to be slowed to a speed below a pre-determined value, if necessary, before the vehicle enters the end section 52 while allowing the vehicle 20 to be propelled through the section 50 at a desired average speed $v_{avg}$ if it is not necessary to stop the vehicle within the block. The cruise LIM primaries typically operate at 75% to 80% of the synchronous speed of the LIM primary 18a and supply thrust to vehicles in the forward mode accordingly.

Since the blocks $B_2$ and $B_3$ are identical, a detailed description of block $B_2$ will only be provided herein. Each of the cruise LIM primaries 18a is connected to a three phase power distribution system PDS via a non-reversible solid state relay 58. The power distribution system PDS is extensive and supplies all of the LIM primaries 18 in the transit system when they are required to provide thrust to a vehicle. The relays 58 are operable to connect the cruise LIM primaries 18a to the power distribution system PDS at full voltage in response to enable signals received from a programmable controller 44. A reversible contact switch 60 which typically remains in the position shown in FIG. 3 is also connected between the relays 58 and the power distribution system PDS. Thus, the reversible contact switch 60 is normally positioned to connect the cruise LIM primaries 18a to the positive phase sequence of the power distribution system PDS but is actuable to connect the cruise LIM primaries 18a to the negative phase sequence of the power distribution system PDS via an auto-transformer 65 in response to signals from the programmable controller 44. The auto-transformer 65 operates to step the nominal full voltage of the power distribution system PDS down so that currents drawn by the LIM primaries 18a during reverse thrust operation are reduced. The use of the auto-transformer and its advantages will be described in more detail hereinafter.

A plurality of sensors 64a to 64g in the form of proximity switches are also located along the track 12 at spaced intervals within speed conditioning section 50 of the block $B_2$. The sensors are positioned between successive LIM primaries 18a and are arranged so that at least one sensor 64 in the section 50 detects the presence of a vehicle 20 located within the conditioning section 50. The programmable controller 44 receives output signals generated by the sensors 64 in response to vehicle detection as well as block occupied signals BLO from the programmable controller 44 located in the adjacent downstream block $B_3$ via a block occupied conductor 66. The programmable controller 44 in turn provides output signals to a data bus 68 interconnecting all programmable controllers 44 in the transit system 10 and extending to a central computer (not shown) so that transit system diagnostics can be carried out and to another block occupied conductor 66 extending to the programmable controller 44 in the adjacent upstream segment $B_1$.

The end section 52 includes a single LIM primary 18b which is controlled by a linear voltage control module (LVCM) 72. The LVCM 72 is capable of connecting the LIM primary 18b to the power distribution system PDS in a manner so that the LIM primary supplies thrust to vehicles passing over the LIM primary 18b having a desired magnitude and direction. Thus, the LVCM 72 can operate the LIM primary 18b so that reverse and forward thrusts of different magnitudes can be applied to different vehicles depending on the desired motion profile of the vehicle passing through the end section 52. The LVCM 72 is also connected to the programmable controller 44 via a stop conductor 80 and controls the operation of the LIM primary 18b in response to signals received from the controller 44 via the conductor 80 as will also be described herein. Details of the operation of the LVCM 72 are described in Applicant's co-pending United States Patent Application entitled "Velocity and Position Controller" filed on Dec. 28, 1989 and issued Ser. No. 456,799.

LVCM sensors 74 are positioned between the rails of the track 12 on opposite sides of the LIM primary 18b and function to detect the presence and direction of movement of a vehicle 20 located within the end section 52. The sensors 74 provide signals to the LVCM 72 so that the LVCM 72 is capable of determining the speed and position of a vehicle 20 as it passes through the end section 52. The LVCM sensors 74 also provide signals to the programmable controller 44. Thus, at least one of the sensors 64 and 74 will always detect the presence of a vehicle within the block $B_2$ and will provide signals to the programmable controller 44 as long as a vehicle 20 is detected within the block.

Since the transit system 10 includes high speed zones 36,38, the operation of the transit system 10 is carried out on the basis that under normal operating conditions there will be no need to stop a vehicle 20 in the designated high speed zones 36,38 to avoid collisions. Minimum occurrence of collisions is therefore controlled by ensuring that the travel time of a vehicle 20 over a block $B_x$ plus the "worst case" stopping distance of a vehicle is at all times less than the minimum headway value, this being the inverse of vehicle throughput expressed as vehicles per minute.

To achieve this, the block length DBL must be equal to or greater than the "worst case" stopping distance of a vehicle. This "worst case" stopping distance of a vehicle is of course determined by the characteristics of the LIM primaries 18 being used to stop the vehicle, the maximum possible mass of the vehicle and the minimum vehicle drag. Another parameter which effects the stopping distance of a vehicle 20 is the spacing between successive LIM primaries 18 in a block. For smooth vehicle travel, the spacing between successive LIM primaries 18 should be equal to the length of the reaction rail 22 secured to each vehicle 20. If non-critical loads such as freight are being transported, the LIM primary spacing can be increased. This introduces higher vehicle accelerations and jerk rates but decreases the costs of the transit system 10. Since the present transit system 10 operates with a LIM primary spacing in the high speed zones greater than the length of the reaction rail 22, the "worst case" stopping distance is greater than the control zone of a single LIM primary. As such, each block $B_x$ requires at least two LIM primaries to stop a vehicle. This requirement is satisfied by providing the cruise LIM primaries 18a in section 50 and the LIM primary 18b in end section 52. Maximizing vehicle throughput in the transit system 10 is achieved by maintaining the separation between two consecutive vehicles travelling through the high speed zones equal to the length of two consecutive blocks DVF. In this manner, a vehicle will never enter a block $B_x$ which is receiving a BLO signal from the adjacent downstream block $B_{x+1}$ and thus, the vehicles will never be required to be stopped in a block unless it is a stopping zone.

In operation, when a vehicle 20 has been manually loaded with freight at the loading station 28, the stopping zone $S_1$ operates to restart the vehicle 20 provided that the following section of track $B_2$ is clear. Once the vehicle 20 has departed from the loading station 28, another vehicle can be brought into the station for loading.

When the vehicle 20 leaves the loading station 28 and enters the second segment $B_2$ of track 12, it is detected by the first sensor 64a in the conditioning section 50. The sensor 64a generates a signal as long as the vehicle 20 is detected thereover and supplies it to the programmable controller 44. As soon as the programmable controller 44 receives a signal from the sensor 64a, it generates a block occupied signal BLO. The BLO signal is then conveyed to the previous block in this case the stopping zone $S_1$ via conductor 66. The BLO signal received by the programmable controller 44 in the stopping zone $S_1$ causes the programmable controller 44 in the stopping zone to inhibit operation of the LIM primaries in the stopping zone. This prevents the stopping zone from propelling a vehicle into the block $B_2$ while it is occupied by another vehicle 20.

When the vehicle 20 reaches the control zone of the first cruise LIM primary 18a, a signal is generated by the second sensor 64b and is conveyed to the controller 44. When the controller 44 receives the signal generated by the second sensor 64b, the time taken for the vehicle 20 to travel between the sensors 64a and 64b respectively is determined. Since the distance between the sensors 64a and 64b is known, the speed of the vehicle 20 entering the control zone of the first cruise LIM primary 18a can be determined. If the vehicle 20 is detected as travelling above a preset speed $V_{avg}$, the controller 44 does not operate the relay 58. This maintains the relay 58 in a disabled condition so that the LIM primary 18a is not energized. Thus, the vehicle 20 coasts along the track 12 over the first cruise LIM primary 18a and decelerates due to friction and drag.

However, if the vehicle 20 is detected as travelling along the track 12 between the two sensors 64a and 64b respectively below the preset speed $V_{avg}$, the controller 44 provides an enable signal to the relay 58 causing it to connect the first cruise LIM primary 18a to the positive phase sequence of the three phase distribution system PDS at full voltage via the contact switch 60. This in turn results in the LIM primary 18a supplying a predetermined forward thrust to the vehicle 20 while the vehicle 20 is located in the control zone of the LIM primary. After the vehicle 20 continues along the track 12 and is detected by the next sensor 64c, the programmable controller 44 disables the relay 58 so that the first cruise LIM primary 18a is deenergized and determines the time taken for the vehicle to travel between sensors 64c and 64d.

When the vehicle is detected by the third sensor 64c, one of two operations is implemented. If the programmable controller 44 is not receiving a block occupied signal BLO from the programmable controller 44 in the adjacent downstream segment $B_3$ via the conductor 66, the elements in the block $B_2$ operate in the same manner described above Thus, the programmable controller 44 allows the second cruise LIM primary 18a to be energized by enabling the relay 58 when the vehicle 20 is detected by sensor 64d as being within the control zone of that LIM primary 18a and if the vehicle 20 is travelling below the preset speed $V_{avg}$. Otherwise, the relay 58 is maintained in a disabled condition so that the vehicle 20 coasts towards the third cruise LIM primary 18a in the section 50 and decelerates due to friction and drag.

If the programmable controller 44 is still not receiving a BLO signal from the controller 44 in the adjacent downstream block $B_3$ when the vehicle 20 is detected by sensor 64f, the same operation, as described above, is performed. Thus, the third cruise LIM primary 18a is operated to provide a forward thrust to the vehicle 20 if it is detected as travelling below the preset speed. Similarly, third cruise LIM primary will remain inactive if the vehicle is detected as travelling above the preset speed. In either case, the vehicle will pass over the third cruise LIM primary 18a and enter the end section 52 at a speed substantially equal to the preset speed $V_{avg}$.

When the vehicle 20 enters the end section 52, it is detected by the first LVCM sensor 74. The sensor 74 in turn provides a signal to the programmable controller 44 so that the BLO signal is maintained on conductor 66 and applied to the programmable controller 44 in the adjacent upstream block $S_1$. The LVCM sensor 74 also provides signals to the LVCM 72 so that the speed and position of the vehicle 20 can be determined. When the vehicle 20 reaches the control zone of LIM primary 18b, the LVCM 72 selects a motion profile and connects the LIM primary 18b to the power distribution system PDS so that the LIM primary 18b operates in the same manner as the cruise LIM primaries 18a. Thus, if the vehicle 20 is detected as travelling below the preset speed $V_{avg}$, a predetermined forward thrust is applied to the vehicle before it leaves the block $B_2$ and enters the next block $B_3$. However, if the vehicle is detected as travelling above the preset speed it is allowed to coast along the track and enter the next segment $B_3$ of track 12.

Figure 4:
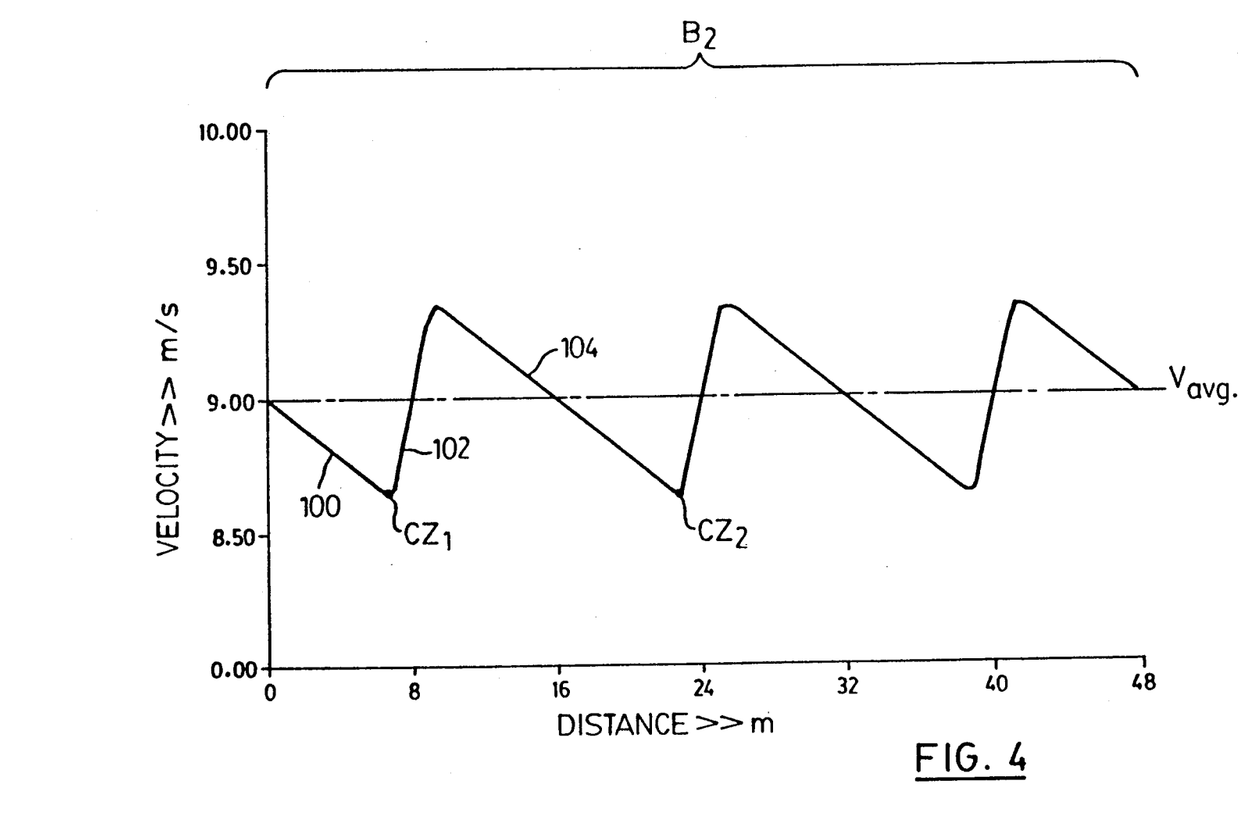
FIG. 4 illustrates the typical movement of a vehicle through a segment of the transit system shown in FIG. 1.

This operation of the LIM primaries 18a and 18b and the resulting thrust supplied to a vehicle 20 passing through the block $B_2$ by the LIM primaries 18a,18b is shown in FIG. 4. As can be seen, as a vehicle travelling at the desired preset speed $V_{avg}$ enters the block $B_2$, it coasts and decelerates (100) until it reaches the control zone $CZ_1$ of the first cruise LIM primary 18a. The cruise LIM primary is then connected to the power system PDS at full voltage so that the vehicle 20 is accelerated rapidly as indicated at 102 to a speed above the average speed. When the vehicle 20 leaves the control zone of first cruise LIM primary 18a, it again coasts and decelerates (104) so that the vehicle 20 reaches the control zone $CZ_2$ of the second LIM primary travelling at a speed less than the preset speed $V_{avg}$. This process is continued throughout the block resulting in successive accelerations and decelerations of the vehicle as it passes through a block while maintaining an average speed. This rapid acceleration and deceleration of the vehicle within the block is acceptable in this transit system 10 since non-critical loads such as baggage are typically carried by the vehicles 20.

However, if the vehicle 20 is detected by the sensor 64c while the programmable controller 44 is receiving a BLO signal from the controller 44 in the block $B_3$, the cruise LIM primaries 18a are operated in a different manner as will be described. This position along the track 12 in the block $B_2$ is designated as the brake decision point BDP. In particular, upon receipt of vehicle detection signals from the sensor 64c and the BLO signal from the controller 44 in block $B_3$, the programmable controller 44 in block $B_2$ generates a switching signal which is conveyed to the reversible contact switch 60. The reversible contact switch 60 in turn actuates to connect the negative phase sequence of the power distribution system PDS to each of the relays 58 in the block $B_2$ via the auto-transformer 64 which steps the power distribution system PDS voltage down, the reasons for which will be described hereinafter.

When the sensor 64d associated with the second cruise LIM primary 18a detects the presence of the vehicle 20, a signal is conveyed to the controller 44 which in turn operates the relay 58. The negative phase sequence of the stepped-down power distribution system voltage is then conveyed to the second cruise LIM primary 18a causing the cruise LIM primary 18a to supply the vehicle 20 with a reverse thrust of a predetermined magnitude so that the vehicle 20 is slowed but not stopped. When the vehicle 20 leaves the control zone of the second cruise LIM primary 18a and is detected by sensor 64e, the second cruise LIM primary 18a is disabled due to the removal of the enabling signal supplied to the relay 58 by the controller 44. When the slowed vehicle 20 reaches the control zone of the third cruise LIM primary 18a and is detected by sensor 64f, the controller 44 energizes the relay 58. This connects the third cruise LIM primary 18a to the power distribution system PDS so that the third cruise LIM primary 18a supplies the predetermined reverse thrust to the vehicle 20 thereby slowing but not stopping the vehicle 20.

When the vehicle 20 leaves the control zone of the third cruise LIM primary 18a and is detected by sensor 64g, the controller 44 disables the relay 58 associated therewith so that the third cruise LIM primary 18a is de-energized. The controller 44, at this time, also generates a stop signal and applies it to conductor 80. The signal on conductor 80 is conveyed to the LVCM 72 which in turn operates to select another motion profile. This motion profile is selected so that the voltage and phase sequence supplied to the LIM primary 18b via the power distribution system PDS causes the LIM primary 18b to generate a reverse thrust sufficient to bring the vehicle 20 to a stop at stopping point SP over the LIM primary 18b. Accordingly, when the vehicle 20 enters end section 52 and is detected by the LVCM sensors 74, the LVCM 72 calculates the speed of the vehicle and energizes the LIM primary 18b in a manner so that the vehicle is slowed and stopped within the control zone of the LIM primary 18b at the stopping point SP.

When the vehicle 20 in the adjacent downstream block $B_3$ departs therefrom, the BLO signal applied to the controller 44 via conductor 66 is removed. In turn, the controller 44 removes the stop signal applied to conductor 80 and the signal applied to the reversible contact switch 60. This of course, actuates the switch 60 to connect the positive phase sequence of the power distribution system PDS to the relays 58. The detection of the removal of the stop signal from conductor 80 by the LVCM 72 and the fact the vehicle 20 is detected by the LVCM 72 as being stopped over the LIM primary 18b causes the LVCM 72 to select another motion profile suitable for re-starting the vehicle 20 so that the vehicle 20 enters the next block $B_3$ of track at a desired speed $V_{avg}$. When the vehicle enters the next block of track 12, the same sequence of operations are performed to avoid collisions by preventing more than one vehicle from entering the same block $B_x$ of track 12.

It should be realized that if a vehicle 20 has passed the braking decision point BDP and hence the third sensor 64c and is being propelled forward by the second cruise LIM primary 18a before a BLO signal is received by the controller 44 (an occurrence which is very rare), the programmable controller 44 operates the reversible contact switch 60 and the relays 58 and conditions the LVCM 72 via the stop signal so that all further operation of the LIM primaries 18a,18b located in the block is in a manner to stop the vehicle in the block at the stopping point. Conversely, if a BLO signal is removed before a vehicle 20 is stopped in the block, the reversible contact switch 60 and LVCM 72 are reconditioned so that the LIM primaries 18a and 18b are operated to supply forward thrust to the vehicle 20.

The LVCM 72 is used in the end section 52 and the LIM primary 18b is chosen to have characteristics so that a vehicle 20 can be stopped in the block $B_2$ under normal conditions even if the vehicle 20 is accelerated by the third cruise LIM primary 18a. However, this operation is not desirable due to the large currents drawn from the power distribution system PDS by the LIM primary 18b to provide the necessary reverse thrust to the vehicle 20 to achieve this result. Under abnormal conditions wherein the LIM primary 18b is not capable of stopping the vehicle 20 within the block, it is generally capable of slowing the vehicle 20 to a speed insufficient to cause damage should two vehicles collide in the next block $B_3$.

Although a specific arrangement of three cruise LIM primaries and one LVCM controlled LIM primary have been shown in the blocks $B_2$ and $B_3$ respectively, in general, the length DBL of each block is related to the length of the high speed zone and the travel time tolerance over the zone. Based on this and given the LIM primary spacing criteria (in this case, greater than the length of a reaction rail 22), the required block length DBL can be determined as well as the minimum number of LIM primaries within each block that are required to bring a vehicle to a stop within the block. Using design procedures, it is possible to obtain a LIM primary with characteristics such that the forward thrust required to maintain the average speed of a vehicle is matched to the braking requirement for the quantity of LIM primaries per block. Thus, the number of blocks of length DBL for a given high speed zone length L can be given by L/DBL which must be an integer value.

Figure 5:
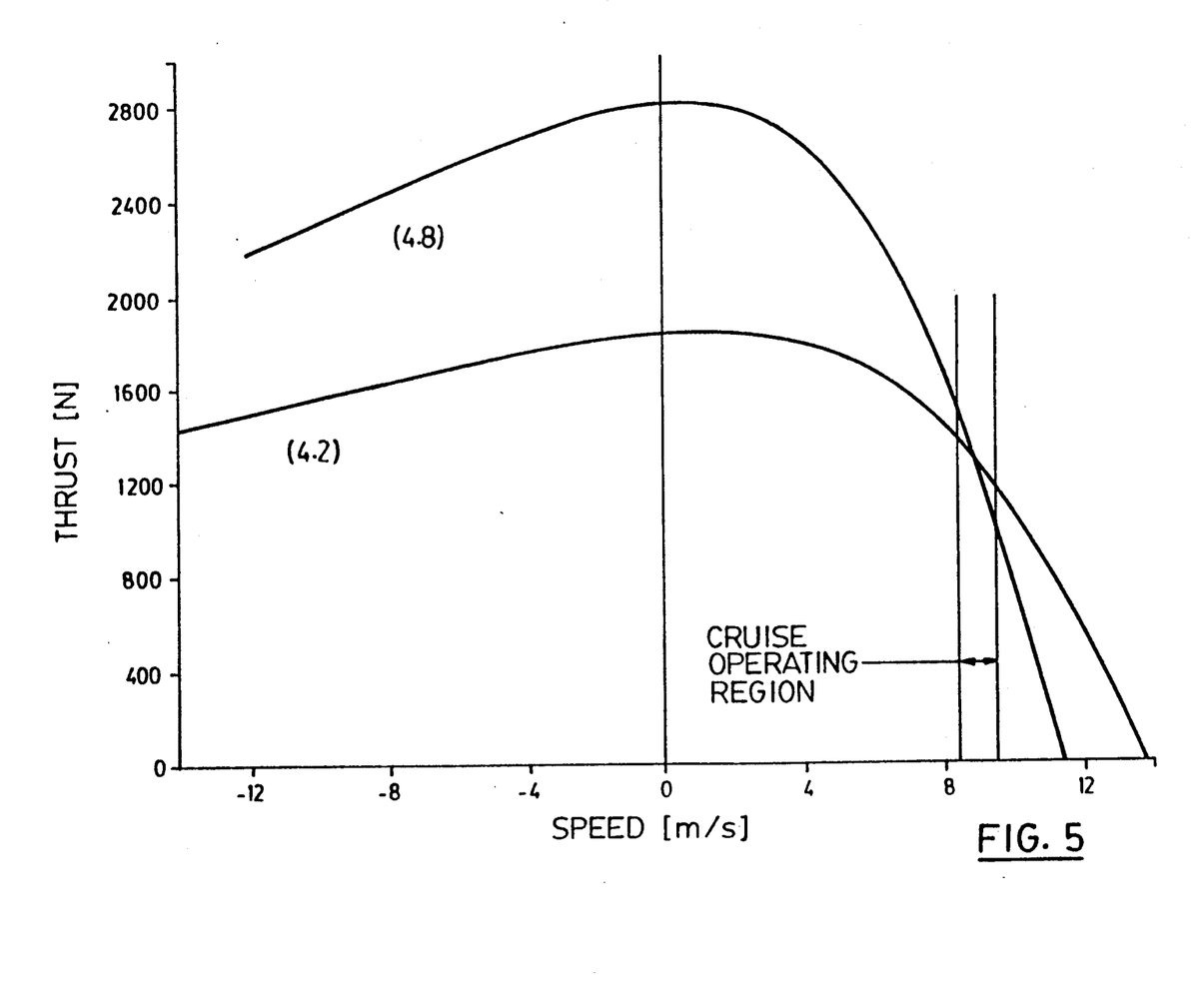
FIG. 5 shows operating characteristics of linear motor primaries.

In many cases, however, the braking thrust of the LIM primaries cannot be matched to the cruising thrust and thus, the braking thrust may be well in excess of the normal operating cruising thrust. To illustrate this, FIG. 5 shows characteristic curves for two LIM primaries having similar cruise operating regions. However, as can be seen, the braking thrust of the different LIMs are significantly different. Thus, a block having LIM primaries spaced sufficient to maintain the average forward velocity of a vehicle, may have excess braking thrust. This results in the reduction of the brake zone length DBD in each block, i.e. it moves the brake decision point BDP closer to the end section 52. Alternatively, the block length DBL can be increased. When increasing the block length DBL or reducing the brake zone length DBD, the minimum vehicle following distance DVF must be equal to or greater than DBD+DBL to avoid collisions. Since the block length DBL can be increased due to the excess braking thrust, a reduction in the number of blocks required in a given high speed zone can be reduced. Since each block $B_x$ requires an LVCM 72 linear motor controller which is expensive, the reduction in the required number of blocks provides advantages in that costs of the transit system are reduced.

In addition to allowing the length of the blocks in the high speed zones to be increased, the excess braking thrust typically available in the blocks provides additional advantages as will be described.

Since operation of a linear induction motor primary to provide reverse thrust to a vehicle typically results in large currents being drawn from the power distribution system PDS, it is desirable to reduce currents drawn so that penalties for excessive peak loads on the power distribution system are not assessed by the hydro utility.

Figure 6:
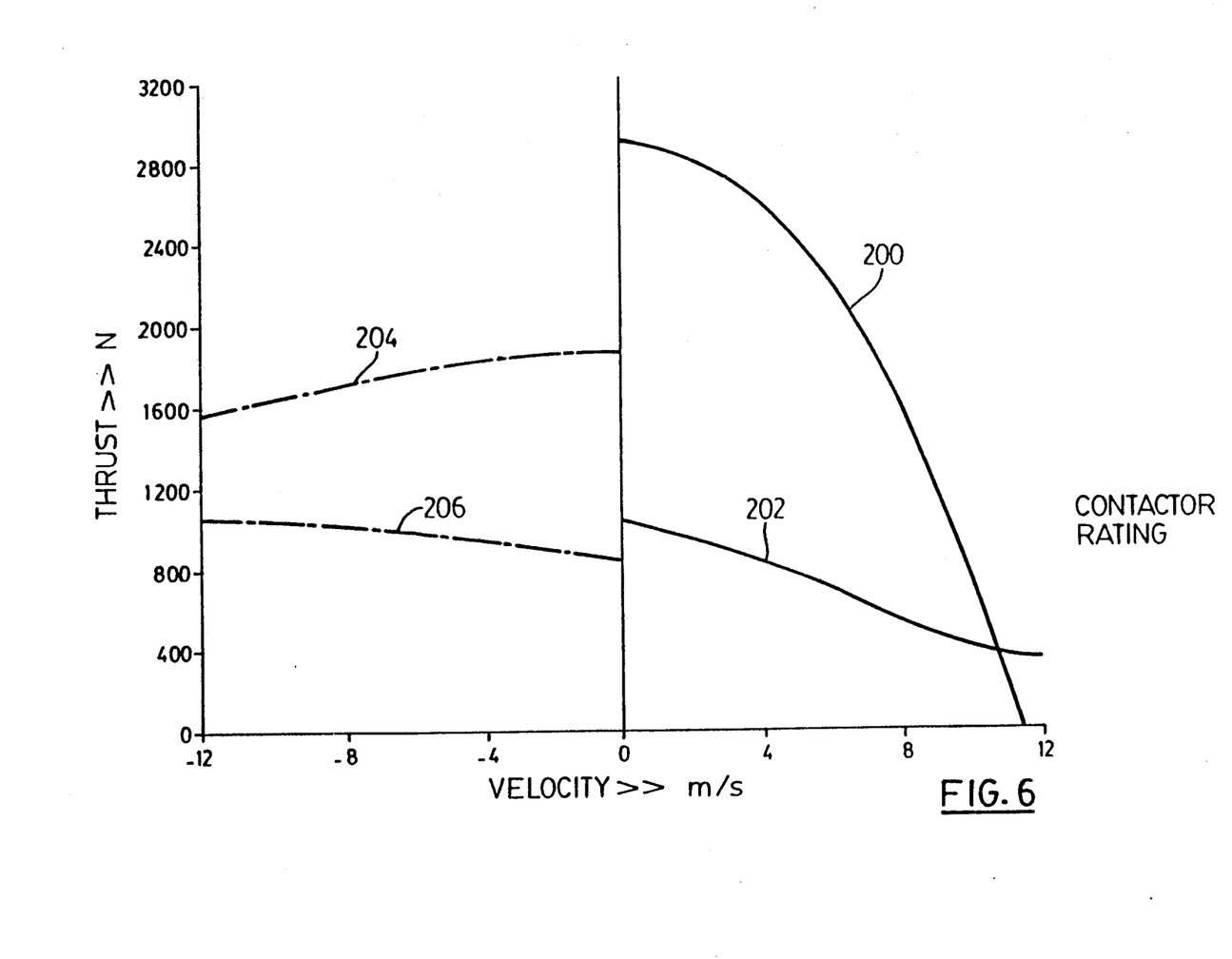
FIG. 6 shows additional operating characteristics of a linear motor used in the portion shown in FIG. 3.

To reduce further peak current drawn from the power distribution system PDS by the cruise LIM primaries 18a, the auto-transformer 65 is provided. The auto-transformer 65 functions to step down the voltage of the power system applied to the LIM primaries 18a via the relays 58 during reverse thrust operation of the LIM primaries 18a. Since the multiple cruise LIM primaries 18a used in the conditioning section 50 of the block $B_x$ provide the block with excess braking thrust, the input voltage supplied to the LIM primaries 18a can be reduced to 80% of the nominal value without adversely affecting vehicle braking within the block. The reduction in the applied voltage to the LIM primaries 18a results in the magnitude of the reverse thrust being supplied to the vehicles 20 by the LIM primaries 18a to be reduced as compared with full voltage reverse thrust operation. FIG. 6 shows a "compound" cruise LIM primary characteristic illustrating positive thrust 200 and current 202 drawn by the LIM primary at full voltage and braking thrust 206 and current 208 drawn by the LIM primary at 80% of the full voltage. As should be apparent, the current drawn by the LIM primary when operated in this manner, remains substantially constant over the entire range of operation.

Accordingly, by employing a voltage reduction during reverse thrust operation of the cruise LIM primaries 18a, the power distribution system current requirements used in the transit system 10 are simplified thereby reducing costs. Also, since maximum peak current drawn is reduced, additional cost savings are achieved.

Thus, the present transit system provides advantages in that high vehicle throughput is achieved while minimizing vehicular collisions increasing block lengths and thereby reducing the required number of expensive controllers, simplifying power system requirements and reducing peak current drawn from the power distribution system PDS.

It should be apparent to those of skill in the art that the brake decision point BDP can be located at alternative locations in the conditioning section 50 of the block. If the BDP point is located at sensor 64a, the voltage supplied to the cruise LIM primaries during reverse thrust can be further reduced since all three cruise LIM primaries will be operated to provide reverse thrust if it is needed to stop a vehicle. Alternatively, if peak current draw is not a concern, the BDP point can be located adjacent sensor 64e so that only the third cruise LIM primary 18a and the LIM primary 18b supply reverse thrust to the vehicle when it is necessary to stop the vehicle.

It should also be apparent to those of skill in the art that the length of the blocks can be increased or decreased and include fewer or more cruise LIM primaries. In addition it should be realized that other sections of the track not designated as high speed zones have a programmable controller 44 and sensors associated therewith to permit BLO signals to be generated and conveyed to upstream controllers so that only one vehicle is permitted in each block of the transit system.

It should be apparent to those of skill in the art that variations and modifications can be made to the present invention without departing from the scope thereof as defined by the appended claims.

We claim:

1. A voltage controller for a primary of a linear motor disposed along a guideway of a transit system, said transit system including at least one vehicle moveable along said guideway, said controller comprising:

switch means operable between first and second conditions, in said first condition, said switch means connecting the primary to the positive phase sequence of a three phase power supply and in said second condition, said switch means connecting the primary to the negative sequence of said power supply;

control means operable to actuate said switch means to one of said conditions so that said linear motor generates thrust in a forward direction when said switch means is in said first condition and in a reverse direction when said switch means is in said second condition; and transformer means interconnecting said power supply and said switch means and reducing the magnitude of current drawn from said power supply by said primary when said switch means is in said second condition below the magnitude of current which would have been drawn from said power supply by said primary if the power supply and switch means were connected directly.

2. A voltage controller as defined in claim 1 wherein said transformer means reduces the voltage of the power supply so that the current drawn by said primary during reverse thrust has substantially the same magnitude as the current drawn by said primary during forward thrust.

3. A voltage controller as defined in claim 2 wherein said transformer means is in the form of an auto-transformer, said auto-transformer reducing the voltage of said power supply to a level equal to approximately 80% of the voltage applied to the primary when said switch means is in the first condition.

4. A voltage controller as defined in claim 3 wherein said switch means is in the form of a reversible contact switch responsive to said control means.

5. A voltage controller as defined in claim 4 wherein said control means is in the form of a programmable controller, said programmable controller being responsive to vehicle operation instruction signals and conditioning said contact switch to one of said conditions in accordance with said instruction signals.

6. A voltage controller as defined in claim 5 further comprising second switch means interconnecting said primary and said first switch means, said second switch means being operable to connect said primary to said first switch means in response to signals from said programmable controller.

7. A voltage controller as defined in claim 6 wherein said programmable controller is associated with a pre-defined section of said guideway and is responsive to signals from a programmable controller associated with an adjacent downstream pre-defined section of said guideway, said programmable controller being operable to condition said first switch means to said first condition when said downstream section is clear and condition said first switch means to said second condition when said downstream section is occupied by another vehicle.

8. A voltage controller as defined in claim 7 wherein a plurality of primaries are associated with said guideway in said pre-defined sections, said first switch means connecting each of said plurality of primaries to said power supply in both of said conditions.

9. A transit system comprising:
 a guideway;
 at least one vehicle carrying a linear motor secondary moveable along guideway, said guideway being divided into a plurality of blocks;
 at least two linear motor primaries disposed along said guideway within at least one of said plurality of blocks at spaced intervals and being operable to supply thrust to a vehicle within said at least one of said plurality of blocks;
 a three phase power supply connectable to said linear motor primaries;
 switch means interposed between said power supply and at least one of said linear motor primaries, said switch means being actuable between first and second conditions to connect said at least one linear motor primary to the positive and negative phase sequence of said power supply respectively;
 control means operable to actuate said switch means to said first condition producing a forward thrust to said vehicle as when in normal operation and to said second condition when it is desired to stop said vehicle in said at least one of said plurality of blocks; and
 transforming means interconnecting said power supply and said switch means and reducing the magnitude of current drawn from said power supply by said primary when said switch means is in said second condition below the magnitude of current which would have been drawn from said power supply by said primary if the power supply and switch means were connected directly.

10. A transit system as defined in claim 9 wherein said transformer means reduces the voltage of the power supply so that the current drawn by said at least one linear motor primary during reverse thrust has substantially the same magnitude as the current drawn by said at least one linear motor primary during forward thrust.

11. A transit system as defined in claim 10 wherein said transformer means is in the form of an auto-transformer, said auto-transformer reducing the voltage of said power supply to a level equal to approximately 80% of the voltage applied to said at least one linear motor primary when said switch means is in the first condition.

12. A transit system as defined in claim 11 wherein said switch means is in the form of a reversible contact switch responsive to said control means.

13. A transit system as defined in claim 12 wherein said control means is in the form of a programmable controller, said programmable controller being responsive to vehicle operation instruction signals and conditioning said contact switch to one of said conditions depending on said instruction signals.

14. A transit system as defined in claim 13 further comprising second switch means interconnecting said at least one linear motor primary and said first switch means, said second switch means being operable to connect said at least one linear motor primary to said first switch means in response to signals from said programmable controller.

15. A zone in a linear motor in-track transit system, said transit system including a guideway and at least one vehicle moveable along said guideway said zone being defined by a section of said guideway and comprising:
 at least two linear motor primaries disposed along said guideway within said zone at spaced intervals and being operable to supply thrust to a vehicle within said zone;
 a three phase power supply connectable to said linear motor primaries;
 switch means interposed between said power supply and at least one of said linear motor primaries, said switch means being actuable between first and second conditions to connect said at least one linear motor primary to the positive and negative phase sequence of said power supply respectively;
 control means operable to actuate said switch means to said first condition producing a forward thrust to said vehicle as when in normal operation and to said second condition producing a reverse thrust to said vehicle as when it is desired to stop said vehicle in said zone; and
 transforming means interconnecting said power supply and said switch means and reducing the magnitude of current drawn from said power supply by said primary when said switch means is in said second condition below the magnitude of current which would have been drawn from said power supply by said primary if the power supply and switch means were connected directly.

16. A zone as defined in claim 15 wherein said transformer means reduces the voltage of the power supply so that the current drawn by said at least one linear motor primary during reverse thrust has substantially the same magnitude as the current drawn by said at least one linear motor primary during forward thrust.

17. A zone as defined in claim 16 wherein said transformer means is in the form of an auto-transformer, said auto-transformer reducing the voltage of said power supply to a level equal to approximately 80% of the voltage applied to said at least one linear motor primary when said switch means is in the first condition.

18. A zone as defined in claim 17 wherein said switch means is in the form of a reversible contact switch responsive to said control means.

19. A zone as defined in claim 18 wherein said control means is in the form of a programmable controller, said programmable controller being responsive to vehicle operation instruction signals and conditioning said contact switch to one of said conditions depending on said instruction signals.

20. A zone as defined in claim 19 further comprising second switch means interconnecting said at least one linear motor primary and said first switch means, said second switch means being operable to connect said at least one linear motor primary to said first switch means in response to signals from said programmable controller.

* * * * *